(12) United States Patent
Silver

(10) Patent No.: US 10,917,830 B2
(45) Date of Patent: *Feb. 9, 2021

(54) CONTROLLING MOBILE DEVICE CALLS, TEXT MESSAGES AND DATA USAGE WHILE OPERATING A MOTOR VEHICLE

(71) Applicant: TANGO NETWORKS, INC., Frisco, TX (US)

(72) Inventor: Andrew Silver, Frisco, TX (US)

(73) Assignee: TANGO NETWORKS, INC., Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,951

(22) Filed: Feb. 4, 2020

(65) Prior Publication Data

US 2020/0178157 A1  Jun. 4, 2020

Related U.S. Application Data

(63) Continuation of application No. 16/267,918, filed on Feb. 5, 2019, now Pat. No. 10,555,240, which is a (Continued)

(51) Int. Cl.

| | |
|---|---|
| *H04W 48/04* | (2009.01) |
| *H04W 4/02* | (2018.01) |
| *H04W 48/02* | (2009.01) |
| *H04L 12/26* | (2006.01) |
| *H04W 4/90* | (2018.01) |
| *H04W 4/50* | (2018.01) |
| *H04W 4/30* | (2018.01) |
| *H04W 4/40* | (2018.01) |
| *H04W 36/32* | (2009.01) |
| *H04W 88/16* | (2009.01) |

(52) U.S. Cl.
CPC ............ *H04W 48/04* (2013.01); *H04L 43/16* (2013.01); *H04W 4/027* (2013.01); *H04W 4/30* (2018.02); *H04W 4/40* (2018.02); *H04W 4/50* (2018.02); *H04W 4/90* (2018.02); *H04W 48/02* (2013.01); *H04W 36/32* (2013.01); *H04W 88/16* (2013.01)

(58) Field of Classification Search
CPC ....... H04W 48/04; H04W 4/04; H04W 4/046; H04W 48/02; H04W 4/30; H04W 4/40; H04W 4/50; H04W 4/90; H04W 4/027
USPC .................. 455/456.4, 418, 419, 420, 456.6
See application file for complete search history.

(56) References Cited

U.S. PATENT DOCUMENTS

| | | |
|---|---|---|
| 6,690,940 B1 | 2/2004 | Brown et al. |
| 2005/0002353 A1 | 1/2005 | Horneman |

(Continued)

*Primary Examiner* — Joel Ajayi

(57) ABSTRACT

Disclosed are a system and method of regulating mobile device communications while operating a motor vehicle. One example method may include determining a speed event indicating that a speed of the motor vehicle has performed at least one of exceeded a first threshold above which mobile device usage restriction policies are invoked and fallen below a second threshold allowing the mobile device restriction policies to be removed. The first threshold may be equal to or greater than the second threshold. As a result of obtaining the speed event, the method may also provide transmitting the speed event to a remote edge gateway server located remotely from the motor vehicle, which stores the speed event for reference purposes when determining a policy for routing a particular mobile device call, text message and/or mobile data session.

20 Claims, 5 Drawing Sheets

Related U.S. Application Data continuation of application No. 15/866,131, filed on Jan. 9, 2018, now Pat. No. 10,200,935, which is a continuation of application No. 15/257,796, filed on Sep. 6, 2016, now Pat. No. 9,867,118, which is a continuation of application No. 14/188,970, filed on Feb. 25, 2014, now Pat. No. 9,439,133, which is a continuation of application No. 13/096,827, filed on Apr. 28, 2011, now Pat. No. 8,666,382.

(60) Provisional application No. 61/328,689, filed on Apr. 28, 2010.

(56) References Cited

U.S. PATENT DOCUMENTS

| | | |
|---|---|---|
| 2006/0023558 A1 | 2/2006 | Cho et al. |
| 2006/0235580 A1 | 10/2006 | Weiss et al. |
| 2007/0249375 A1 | 10/2007 | Zapata et al. |
| 2010/0216509 A1 | 8/2010 | Riemer et al. |

CONTROLLING MOBILE DEVICE CALLS, TEXT MESSAGES AND DATA USAGE WHILE OPERATING A MOTOR VEHICLE

TECHNICAL FIELD OF THE INVENTION

This invention relates to a method and apparatus of controlling mobile telephones and other mobile devices while operating a motor vehicle, and, more specifically, to monitoring and controlling usage restrictions while the motor vehicle is being operated.

BACKGROUND OF THE INVENTION

Operating a mobile device while driving can distract the driver of a motor vehicle (i.e. transport vehicle). A mobile device may include any mobile device capable of establishing communications with a network, such as a cell phone, tablet computing device, laptop, smart phone, etc. Certain concerns have been raised to restrict drivers from using a mobile device while the vehicle is in motion. One example of such restrictions may include local laws and ordinances that have been imposed on drivers that make it illegal to utilize a mobile device while driving. Other laws simply limit the usage of mobile devices while traversing certain restricted areas (e.g., a school zone).

In order to enforce such legal regulations related to mobile devices, local law enforcement must observe a driver committing an infraction and subsequently impose a fine on the driver. Such a method of law enforcement can be considered a passive method for controlling the device, since it is the driver's responsibility to restrict usage of the mobile device. This can be a problem since the law cannot be easily enforced, and thus the user will not stop using the mobile device while operating their motor vehicle.

Current methods for addressing these issues rely on device-based solutions, rather than network-based solutions. For example, device-based solutions are typically custom-designed for the device and/or the vehicle and are typically expensive to implement or require the use of a "smartphone"—a mobile telephone with an operating system onto which third party software can be deployed, and which has access to a global positioning system (GPS) receiver as well as additional wireless protocols such as Bluetooth and/or WiFi.

Examples of conventional vehicle tracking systems are used by delivery companies such as UPS® and Fedex®. In these systems, vehicles are equipped with proprietary mobile devices that must be placed in a proprietary docking station inside the vehicle in order for the vehicle to be placed in motion. When in motion, the devices impose limitations on their usage, such as preventing the driver from reading certain information screens while the vehicle is in motion to prevent driver distractions originating from the mobile device.

Other examples may include solutions from third party vendors that deploy software on a specific smartphone mobile device, such as an Android®, Apple iPhone®, RIM Blackberry®, or Windows Mobile device, etc. In these examples, the software accesses the device-based GPS to identify when the device is moving at a certain velocity (e.g. >5 mph), at which point the device restricts the use of text messages and or calls from being accessed via the mobile device.

While both of these types of solutions are technically feasible, they face significant hurdles to adoption, including cost, difficulty of use, and restrictions on which devices can be used (e.g., only certain smartphones from certain carriers). Other concerns include identifying when the user is actually in the vehicle and when the individual is in command of the vehicle, and providing safeguards that prevent a user from circumventing the system.

SUMMARY OF THE INVENTION

One embodiment of the present invention may include a method of regulating mobile device communications while operating a motor vehicle. The method may include determining a speed event indicating that a speed of the motor vehicle has performed at least one of exceeded a first threshold above which mobile device usage restriction policies are invoked and fallen below a second threshold allowing the mobile device restriction policies to be removed. The first threshold is equal to or greater than the second threshold. The method may also include transmitting the speed event to a remote edge gateway server located remotely from the motor vehicle, and storing the speed event in the remote edge gateway server.

Another example embodiment of the present invention may include a system configured to regulate mobile device communications while operating a motor vehicle. The system may include an edge gateway server configured to determine a policy associated with a speed event indicating that a speed of the motor vehicle has performed at least one of exceeded a first threshold above which mobile device usage restriction policies are invoked and fallen below a second threshold allowing the mobile device restriction policies to be removed. The first threshold is equal to or greater than the second threshold. The apparatus may also include a transmitter device configured to obtain and transmit the speed event to a remote edge gateway server located remotely from the motor vehicle, the remote edge gateways server comprising memory configured to store the speed event in the remote edge gateway server.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments of the present invention may include a method to control the use of a mobile device during the operation of a motor vehicle. The controlling may include limited access to dialing calls, transmitting and/or receiving text messages and/or transferring other mobile data while operating the motor vehicle. A motor vehicle may be referred to synonymously with transport vehicle or transport means, such as an automobile, motorcycle, truck, bus, boat, train, aircraft, all-terrain vehicle (ATV), etc.

According to other embodiments of the present invention, a method is disclosed to enable an active responsible driver system (RDS) solution to control mobile devices when a user has established certain predefined criteria, such as being in command of a vehicle in motion, and/or traversing a specific area requiring usage restrictions.

Figure 1:
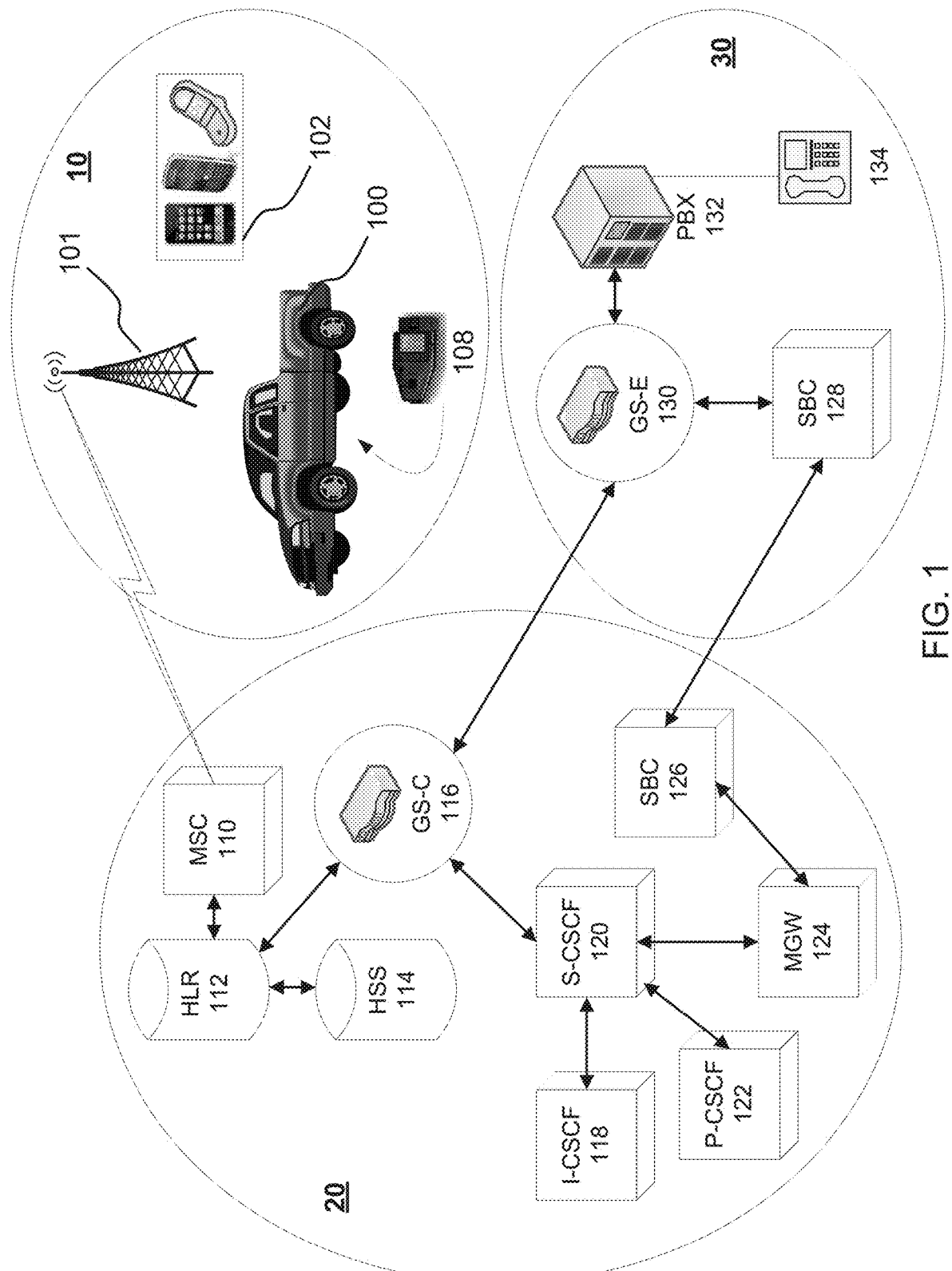
FIG. 1 illustrates an example network configuration, according to example embodiments of the present invention.

FIG. 1 illustrates a mobile network and related communication system corresponding to example embodiments of the present invention. Referring to FIG. 1, an operating network area of a mobile device 10 is illustrated as being in communication with a mobile network 20 and an enterprise network 30. A mobile device 102 may have a subscription to a mobile service on the mobile network 20 operated by a mobile telephone network service provider and/or service carrier. The mobile device may be a smartphone, cell phone, tablet computing device, or other device capable of communicating with a cellular infrastructure (i.e., base station 101).

The mobile device 102 may maintain a subscription for service on the mobile telephone network service provider's network 20. The subscription may be provisioned and stored in memory in the carrier's home location register (HLR) 112 and/or a home subscriber server (HSS) 114. Such subscription information may include the subscription information for enabling mobile device calls to be originated and terminated, text messages to be originated and terminated, and for mobile data to be requested and delivered.

To control the mobile device 102, the mobile subscriber's profile stored in the HLR 112/HSS 114 is activated accessed prior to, or when a call attempt or text message is originated or terminated with the mobile device 102. In the case of a call, the mobile switching center (MSC) 110 or call session control function (i.e., interrogating—I, servicing—S, and proxy—P-CSCFs) 118-122, verify the subscriber profile from the HLR and/or HSS to determine the services of the subscriber. In an IP multimedia system (IMS) network, the S-CSCF obtains the initial filter criteria (IFC) information which may instruct the S-CSCF to query a session initiation protocol (SIP) application server (SIP-AS) represented by 116 before routing a session. Similarly, in a circuit-switched network, the MSC 110 obtains the trigger information which may instruct the MSC 110 to query a service control point (SCP) represented by 116 before routing a call. The SCP or SIP-AS 116 may then analyze the origination and/or termination information and apply logic to instruct the MSC 110 or S-CSCF 120 on how to route the call, session or text message. The SCP or SIP-AS 116 can be split between two nodes, in this case the carrier gateway server 116 and the edge gateway server 130 which may be located in an external network such as an enterprise.

A call that is originated from or terminated to the mobile device 102 may have an alternative treatment applied based on a service condition. For example, a call may be allowed or disallowed or re-routed in response to the service condition. Similarly, the call may be intercepted by the system and stored in memory along with the intended destination if the vehicle is being operated by the user of the mobile device. A call may be augmented with a predefined indication or recorded message to alert the user of the service condition with or without prompting for acknowledgement and/or reason, but still allowing the call to be received. A call may be received and/or a call termination can be re-routed to voicemail or to a recorded message for the calling party (e.g., "the user is unavailable at this time"). A terminating text message can be stored for later delivery to the mobile device 102, an originating text message from the mobile device 102 can be prevented from being delivered, etc.

Mobile data transferred to or from the mobile device 102 may require a mobile data gateway such as a gateway GPRS support node (GGSN) that is connected to a carrier's serving GPRS support node (SGSN), or alternatively, a foreign agent (FA) that is connected to a carrier's Home Agent (HA). For example, a mobile data request transferred from a mobile device 102 can be prevented or delayed from being delivered to a server.

A mobile data response can also be prevented or delayed from being delivered to the mobile device 102. The message may be blocked or intercepted by temporarily storing the message in memory and releasing the message into the network once a predefined condition and/or restriction has passed (e.g., a communication blocked location). In other words, the message may be preserved or just re-routed until certain conditions have been satisfied. Similarly, a mobile data request or response can be augmented with an indication or recorded message to alert the user of the condition with or without a prompting for acknowledgement and/or a reason, but still allow the message to proceed.

According to example embodiments of the present invention, a mobile network may be configured with a gateway server (GS) that can act as a SCP, a SIP-AS and/or a GGSN. The GS is split into two functions, the GS-C 116 located in the carrier network 20 and the GS-E 130 located at the edge of the network, such as in an enterprise or service control network (SCN) 30.

An enterprise may represent a corporation that desires to control the mobile phones of their employees, such as UPS® or Fedex® controlling the mobile phones of their drivers. In such a case, it is possible that the GS-E 130 is also connected to the enterprise voice communications networks including for example, a private branch exchange (PBX) 132 coupled to a telephone device 134, and an IP-PBX and/or unified communications (UC) system. A media gateway (MGW) 124 and SBCs 126 and 128 may provide a communication path to the enterprise network 30. A switched circuit network (SCN) may represent a hosted service provider that offers a service to many small or large corporations for controlling the mobile phones of the corporation's employees. An SCN may also offer such a service to consumers or agencies, for example to enable parents to control the mobile phones of their children, schools to control the mobile devices of their bus drivers, or municipalities or governments to control the use of mobile phones of users that have received infractions for unsafe driving or for using a mobile phone in a school zone.

In other configurations, the GS-E 130 can also be located in the carrier's network 20, or be hosted by a third party in a multi-tenant model that offers the service to many individual enterprises and/or consumers from a single GS-E 130. The GS-C 116 and GS-E 130 can also be combined into a single function allowing the policy and services of the GS-E 130 to be handled by the combined GS (GS-C 116 plus GS-E 130) node.

According to another example embodiment an on board diagnostic (OBD) system may be used. OBD systems are in most automobiles today. The OBD-II standard was introduced in the mid 1990's, and has been mandated on all automobiles manufactured for sale in the United States since Jan. 1, 1996. The same OBD-II or similar systems are used in most countries around the world.

All OBD-II automobiles have an OBD-II compliant connector located in the passenger compartment that is easily accessible from the driver's seat. This port provides information about the vehicle's state, including malfunction indicators, diagnostic trouble codes and other vehicle information for self-diagnosis and reporting capabilities.

Figure 2:
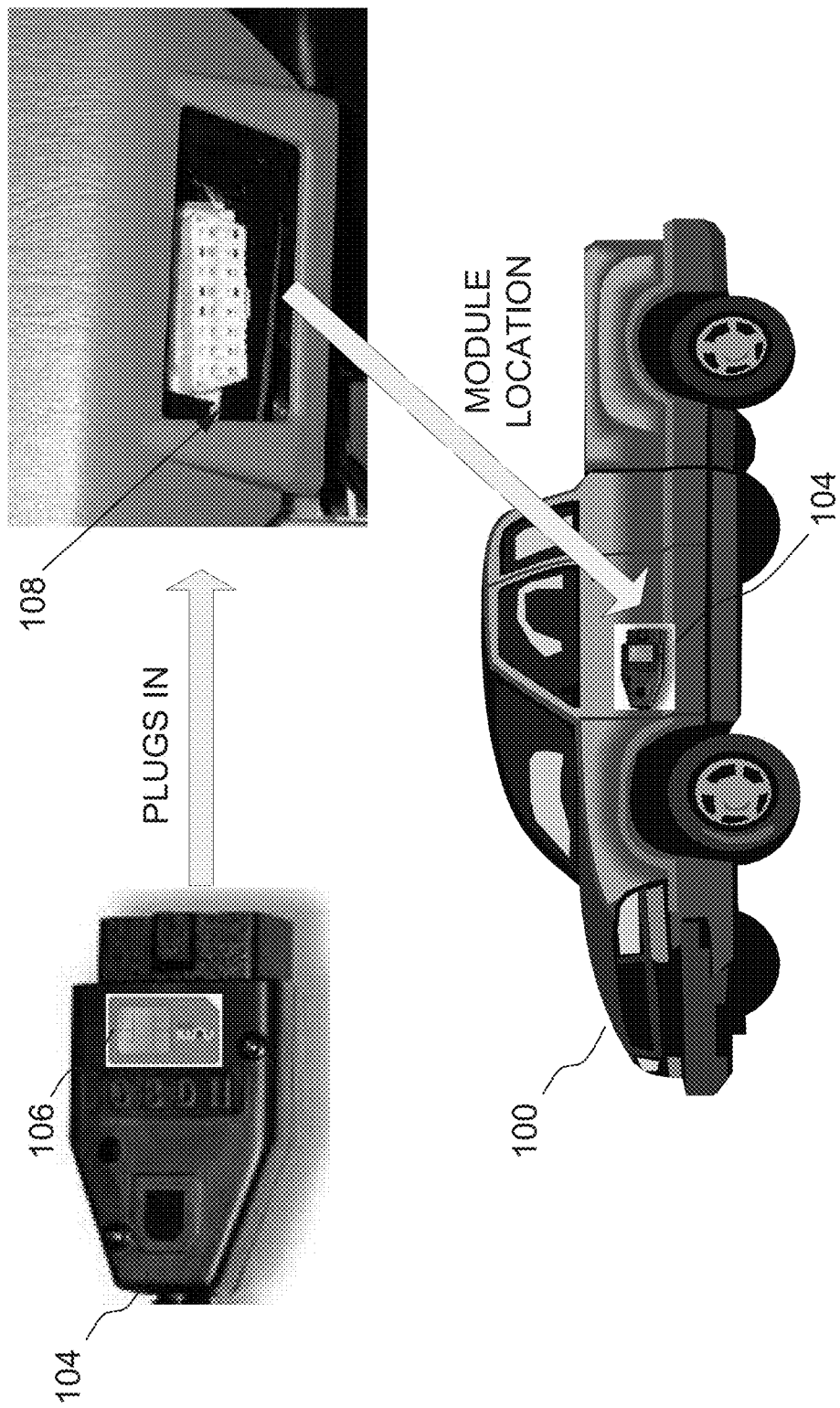
FIG. 2 illustrates an example RDS sensor (RDSS) configuration, according to example embodiments of the present invention.

FIG. 2 illustrates an example OBD and RDS system, according to example embodiments of the present invention. Referring to FIG. 2, a motor vehicle 100 is configured with an OBD interface 108 that is illustrated in detail as being part of the dashboard. The OBD module 104 denoted as the RDS sensor, or RDSS, plugs into the OBD-II connector 108 of the vehicle. The RDSS is capable of obtaining information from various vehicle subsystems in order to identify when the vehicle is on, when the vehicle is in motion, and at what speed the vehicle is traveling.

The RDSS 104 itself may include a system of elements including an OBD-II processor (not shown) for interfacing with the vehicle's OBD-II port 108 via a variety of communication protocols. A corresponding wireless communication system (not shown) may include a radio communications system such as GSM, CDMA, LTE, WiMAX and/or WiFi, which may further include a SIM card 106 for communicating with a mobile network in the case of a GSM mobile network. The system may also include a general computing platform (not shown) for storing program logic for the operation of the RDSS system. The RDSS 104 can be used to send information to and from a server connected over the Internet via the mobile data connection. Data messages may be transmitted via short message service (SMS) text messaging, or via other communication protocols, such as unstructured supplementary services data (USSD), data over voice (DOV) or Internet protocols such as TCP or UDP over mobile data transport. The RDSS may be equipped with a location-determining capability, such as for example assisted GPS (A-GPS), which complies with the U.S. F.C.C. wireless enhanced 911 phase-2 mandate for all mobile phones.

The RDSS 104 may have its own subscriber information module (SIM) card 106, which is compatible with a GSM-based network, a CDMA-based network or other mobile wireless network. In either case, the RDSS represents a separate subscription to the carrier, and may be considered a machine-to-machine (M2M) subscription, which may cost less than a full mobile services subscription for a mobile telephone user. The RDSS subscription is associated with one or more subscribers provisioned in the GS-E 130 that are configured to have their mobile services controlled when they are operating a vehicle in which the RDSS is installed.

The RDSS may be built into automobiles by manufacturers, either as optional equipment or included with all vehicles. The RDSS system is informed when the vehicle is turned on. The RDSS 108 then sends a data notification message to the GS-E 130 associated with the subscriber. This message can be sent over the internet as a mobile data message, or via SMS or USSD in the case that the RDSS is not capable or configured to support mobile data service.

Note that the message can be sent directly to the GS-E 130, or alternatively, it can be sent to the GS-E 130 via the GS-C 116. In the latter case, the RDSS can be preconfigured to send the message to the GS-C 116 in the carrier network 20, and the GS-C 116 then identifies the corresponding GS-E 130 to which the subscriber belongs. In this example, all RDSSs can be pre-programmed to always route to the carrier's GS-C 116.

On reception of the notification that the vehicle has been turned on, the GS-E 130 may then order the GS-C 116 to obtain the location of the RDSS 108 and the RDS mobile 102. To do this, the GS-C 116 can send a request to the carrier's mobile location center (MLC), which will obtain the location information for each device. The MLC may be part of the MSC 110. On reception of the location information of the devices, the GS-E 130 can then calculate the distance between the two devices to determine if the RDS subscriber 108 is actually located in the vehicle. The distance between the two devices must be less than a predetermined amount to qualify that the RDS subscriber device 102 is within the vehicle. Typically this would be within a maximum of 300 meters, in compliance with the worst case requirements for E-911 phase-II, but more likely within 5-50 m range.

Note that situations may occur where the RDS subscriber 102 is located inside the vehicle when in fact they are standing outside the vehicle and someone else is driving the vehicle. This would result in the RDS subscriber being subject to RDS policies until the vehicle is driven away and the locations are subsequently re-checked. To reduce and/or eliminate this case, once the vehicle has been determined to be in motion, such that the vehicle has exceeded the hysteresis activation speed (for example, the vehicle may be required to move above a threshold activation speed, such as 15 mph), then the location-determination procedure can be performed a second time. The MLC is again queried for the locations of the RDSS 108 and the RDS mobile 102, and the GS-E 130 can then calculate the distanced between the two devices. If the distance is greater than the previous location determination, then it is likely that the user is not located inside the vehicle. If the distance remains to be less than a maximum of 300 meters apart, then it is likely the user is indeed located inside the vehicle.

Another situation that can occur is that the RDS subscriber 102 may be a passenger in the vehicle and as such is not the driver, but would nevertheless be subject to the RDS policies. In this case the RDS 108 can be overridden to enable the RDS subscriber 102 that is not the driver to be exempt from the RDS policies. Typical methods for overriding the service may be a service code such as "*55" which would be recognized by the GS-C 116 and GS-E 130 even if the RDS user is being subjected to the RDS policies. Similarly, a mobile data or text message could be sent to the GS-E 130 to override the RDS service. Alternatively, the subscriber 102 can be provided with a recorded message with a prompt for input on the voice channel to which they can respond, which may also be achieved via a text message or mobile data prompt. The response from the subscriber 102 can be stored in the network as part of an event record which can be used as evidence or serve as input to a driver scoring algorithm.

In order to reduce the possibility of a driver attempting to override the system, the RDS 108 could require that the override code be sent by two different RDS subscribers, or even by one RDS and one non-RDS subscriber. The second subscriber would typically be the person actually driving the vehicle. In another case, the second person could be a designated administrator such as a parent or supervisor, located outside the vehicle. The RDS subscriber sends the override code to the GS-E 130, and on reception, the GS-E 130 sends a notification to the assigned administrator to approve the RDS override.

The RDSS 108 is informed when the vehicle is in motion. The speed at which the RDS invokes the RDS restriction policies may be set by the administrator of the service. Typically this would be at a speed of 5-15 mph. A hysteresis algorithm can be utilized to prevent the system from activating and deactivating the RDS policies excessively when the vehicle is in stop-and-go traffic. Typically the hysteresis profile may be set to activate the RDS policies when the vehicle equals or exceeds 15 mph, and deactivates the RDS policies when the vehicle falls below 5 mph.

When the RDSS 108 determines that the vehicle is in motion, for example by exceeding the hysteresis speed of 15 mph, the RDSS 108 then sends a data notification message to the GS-E 130 associated with the subscriber 102. This message can be sent over the internet as a mobile data message, or via SMS or USSD in the case that the RDSS is not capable or configured to support mobile data service. Note that the message can be sent directly to the GS-E 130, or alternatively, it can be sent to the GS-E 130 via the GS-C 116. In the latter case, the RDSS 108 can be preconfigured to send the message to the GS-C 116 in the carrier, and the GS-C 116 then identifies the corresponding GS-E 130 to which the subscriber belongs. In this case all RDSSs can be pre-programmed to always route to the carrier's GS-C 116.

On reception of the notification that the vehicle is in motion, the GS-E 130 then invokes the RDS 108 restriction policies for the RDS subscriber that had been previously determined to be located in the vehicle and for which the RDS 108 had not received an override request. The RDS restriction policies can be set to different support capabilities based on a variety of conditions. For example, in its simplest form the RDS policy for a particular subscriber can be set to prevent all mobile calls, texts or mobile data traffic to or from the mobile device 102.

Alternatively, the policies for a particular RDS subscriber 102 can be set to allow incoming calls and incoming texts, but not outgoing calls or outgoing texts while the vehicle is in motion. Another possibility may be to allow incoming texts or calls only if they are processed by the hands-free Bluetooth enabled mobile phone service operated by the vehicle speaker and microphone system to ensure the user's hands are free to drive and not operate the mobile device 102.

The RDS 108 can also invoke a different set of policies for RDS subscribers 102 traveling in the vehicle but which are not the driver. For example, for these passengers the RDS policy can be set to enable incoming and outgoing texts but restrict incoming and outgoing calls, so as not to disturb the driver. In another example, calls to and from an RDS subscriber 102 can include an alert or voice message to indicate the vehicle is in motion, but still allow the call to route. In addition, the RDS subscriber can be presented with a prompting for input to confirm acknowledgement and or a reason for electing to order the system to proceed with the call, after which the system records the user's selection and other call details and proceeds with routing the call.

According to another example, the system may provide the RDSS 108 is independent of the mobile phone device 102 and the mobile network 10 and carrier network 20. The RDSS 108 reports vehicle speed to the GS-E 130 anytime the predefined thresholds are reached or crossed. When a call/text/data session is attempted to or from the mobile device 102, the switching network sends a request for action to the GS-C 116, which responds by sending an inquiry to the GS-E 130. As a result, the GS-E 130 checks the last recorded speed event received from the RDSS 108 and uses that as input to determine the policy on how to route the session. The RDSS 108 itself is a system, which has a transmitter and a processor. The processor is used to assess the vehicle speed and orchestrate the transmission of the events via a transmitter to the edge gateway server. The RDSS 108 reports the vehicle events to the GS-E 130.

In the case where a user does not respond to the prompting, for example in the case where they are incapacitated, the system may proceed to route the call and either record or ignore the call details. An allowed list of callers can be setup that overrides the RDS policies, such as to always enable calls or text messages to/from an administrator such as a parent or supervisor, even while the vehicle is in motion. Emergency calls such as to 911 or other emergency services will always override the RDS policies.

Note that if the RDSS 108 and/or RDSS subscriber's mobile device 102 are located in an area where the service coverage from the mobile network is insufficient to deliver the messages, then it may not be possible for the RDSS to function. However, in such a case it will be equally impossible for the RDS subscriber 102 to utilize the mobile network to make or receive calls and/or send/receive data messages. Once the vehicle is in motion and it has been determined that the RDS subscriber 102 is in the vehicle, the RDS policies are invoked by the GS-E 130.

In the case of a call origination, whenever a RDS subscriber originates a mobile telephone call or session, the MSC 110 or CSCF (118-122) sends a notification to the GS-C 116 requesting instructions before the call can be routed. The GS-C 116 identifies to which GS-E 130 the subscriber belongs (e.g., the subscriber is an employee of Acme corporation). The GS-C 116 then forwards the information about the call request to the corresponding GS-E 130 located in the enterprise network 30 of Acme corporation. The information sent may include the originating subscriber information, the desired destination, the subscriber's present location as well as other network-based service information. Note that the GS-C 116 may not necessarily be physically located in the carrier network 20, and may instead be hosted external to the carrier's network 20 and interconnected via the Internet Protocol (IP) and/or signaling system #7 (SS7) signaling.

The GS-E 130 may not necessarily be physically located in the enterprise network 30. Instead, the GS-E 130 could be hosted external to the enterprise network 30, for example in the carrier's network 20 or in a third party hosting facility, and interconnected with the enterprise via an IP connection. In the case where the GS-E 130 is hosted by a carrier 20 or third party, it is possible for the GS-E 130 to be configured as a multi-tenant platform allowing many enterprises 30 to utilize the same GS-E 130, and where each enterprise 30 acts as a shared and securely separated tenant of the GS-E 130.

On reception of the information from the GS-C 116, the GS-E 130 then applies logic to this information in accordance with specific policies to decide whether or not to allow the call origination to continue, and if so what instructions to send back to the GS-C 116 for the GS-C 116 to instruct the MSC 110 or CSCF (118-122). If it has been determined that the RDS subscriber 102 is not located inside the vehicle 100, or if the vehicle is not activated (i.e. powered on) or the vehicle is not moving, or the vehicle is not moving over the hysteresis activation speed (e.g. >=15 mph), then the GS-E 130 may instruct the GS-C 116 to allow the call to proceed as normal.

If however the vehicle is already activated (i.e. powered on) and in motion, and it has been determined that the RDS subscriber 102 is inside the vehicle, then the GS-E 130 may elect to disallow the call origination request. Or the call may instead be routed to a pre-recorded message that may inform the driver that they cannot originate a call while the vehicle is in motion, or invoke other data communications. If the RDS subscriber 102 has dialed an emergency number, the system would allow the call to be routed irrespective of any of the above conditions. The RDS 108 may also allow only specific phone numbers to be called when the above conditions are met, for example a pre-approved list, such as to a systems administrator, manager, spouse or child. In such a case, the system may inform the RDS subscriber 102 during the call setup that a particular call is being allowed for one of the above-noted purposes despite the vehicle being in motion.

For a call termination to the subscriber, prior to routing the call the user, the MSC 110 or CSCFs (118-122) would send a notification to the GS-E 130, which would determine the appropriate routing instructions. Similar to the above case of call origination, if it has been determined that the RDS subscriber 102 is not located inside the vehicle 100, or if the vehicle is not activated (i.e. powered on) or moving, or the vehicle is not moving over the hysteresis activation speed (e.g. >=15 mph), then the GS-E 130 may instruct the GS-C 116 to allow the call to proceed as normal.

If however the vehicle is activated (i.e. powered on) and in motion, and it has been determined that the RDS subscriber 102 is inside the vehicle, then the GS-E 130 may elect to disallow the call termination request, or may instead route the call to a pre-recorded message that may inform the caller that the RDS subscriber cannot be reached at this time, or alternatively invoke other treatments. If it is an urgent matter, the remote caller may be able to override the system with a special code that would force the call to be routed to the RDS subscriber 102 irrespective of any of the above conditions.

The RDS 108 may also allow calls from only specific phone numbers to be routed when the above conditions are met, for example from a pre-approved list, such as from a systems administrator, manager, spouse or child. In such a case, the system may inform the RDS subscriber 102 with a special ring tone, a text message delivered in advance of the call alerting, or a recorded message upon the call being answered that this particular call is being allowed despite the vehicle being in motion.

In the case of text message originations and terminations, the case for controlling incoming and outgoing text messages is similar to the case of mobile originations and terminations for mobile calls. Once the vehicle is in motion and it has been determined that the RDS subscriber is in the vehicle, the RDS policies are invoked by the GS-E 130. In the case of a mobile originated text message (MO-T), whenever an RDS subscriber 102 originates a text message, the MSC 110 or CSCF (118-122) sends a notification to the GS-C 116 requesting instructions before the text can be routed. The GS-C 116 identifies which GS-E 130 provides a subscription to the subscriber, for example the subscriber may be an employee of Acme corporation. The GS-C then forwards the information about the call request to the corresponding GS-E located in the enterprise network (of Acme corporation).

The information sent may include the originating subscriber information, the desired destination, the subscriber's location as well as other network-based service information. Upon reception of the information from the GS-C 116, the GS-E 130 then applies logic to this information in accordance with specific policies to decide whether or not to allow the text message to continue onward, and if so, what instructions to send back to the GS-C 116 for the GS-C 116 to instruct the MSC 110 or CSCFs 118-122 and/or the short message service center (SMSC), which may be part of the MSC 110.

If the RDS subscriber 102 is not located inside the vehicle 100, or if the vehicle 100 is not activated (i.e. powered on) or the vehicle is not moving, or the vehicle is not moving over the hysteresis activation speed (e.g. >=15 mph), then the GS-E 130 may instruct the GS-C 116 to allow the text message to proceed as normal. If however the vehicle 100 is activated (i.e. powered on) and is in motion, and the RDS subscriber 102 is inside the vehicle 100, then the GS-E 130 may elect to disallow the text message from being delivered, and may instead deliver a text message to the RDS subscriber 102 with an indication that the text message failed and the reason (e.g. "vehicle is in motion"). Or instead, the GS-E 130 may invoke other treatments.

The RDS 108 may also allow text messages to be sent only to specific phone numbers when the above conditions are met, for example a pre-approved list, such as to a systems administrator, manager, spouse or child. In such a case, the system may inform the RDS subscriber 102 with a text message response and/or confirmation that because this particular text message is allowed to be delivered despite the vehicle being in motion. The system may elect to defer delivery of the confirmation message until such time as the restrictions have been lifted, for example when the vehicle comes to a stop.

For a mobile terminated text message (MT-T) to the subscriber, prior to routing the text message to the user, the MSC 110 or CSCFs 118-122 would send a notification to the GS-E 130 that would determine the appropriate routing instructions. Similar to the above case of MO-T, if it has been determined that the RDS subscriber is not located inside the vehicle, or if the vehicle is not activated (i.e. powered on) or the vehicle is not moving, or the vehicle is not moving over the hysteresis activation speed (e.g. >=15 mph), then the GS-E 130 may instruct the GS-C 116 to allow the text message to proceed as normal.

In the case where the vehicle is activated (i.e. powered on) and in motion and it has been determined that the RDS subscriber 102 is inside, then the GS-E 130 may elect to disallow the text message from being delivered, and may instead deliver a text message to the originator with indication the text message failed and the reason (e.g. subscriber is unavailable at this time), or may invoke other treatments. The system may alternatively elect to defer delivery of the message in a queue, such as in the MSC 110, until such time as the restrictions have been lifted, for example when the vehicle comes to a stop. The RDS 108 may also allow text messages to be received only from specific phone numbers when the restrictions are in place, for example a pre-approved list, such as from a systems administrator, manager, spouse or child.

According to one example embodiment of the present invention, a method of regulating mobile device usage may include determining a speed event indicating that a speed of the motor vehicle has performed at least one of exceeded a first threshold above which mobile device usage restriction policies are invoked and fallen below the first threshold allowing the mobile device restriction policies to be removed at operation 402. The speed event may be a particular instance of motor vehicle speed measure by a GPS measurement, local radar or a mobile device application that uses GPS or the carrier network. The method may also provide transmitting the speed event to a remote edge gateway server located remotely from the motor vehicle, at operation 404 and storing the speed event in the remote edge gateway server, at operation 406.

Subsequently, at least one mobile device in the vehicle may perform originating at least one of an attempted voice call, text message and mobile data communication session. As a result, the method may further provide querying a carrier gateway server to determine how to route the mobile data communication session. A message may be sent informing the remote edge gateway server of the mobile data communication session attempt and the stored speed event may be verified to determine whether to invoke mobile device usage restriction policies. The method may also include sending routing instructions to the carrier gateway server indicating how to route the mobile data communication session, and routing the mobile data communication session responsive to receiving the routing instructions. A location of the mobile device(s) may be determined to be in close proximity to the motor vehicle based on a distance between the at least one mobile device and the motor vehicle.

Regarding mobile data restrictions, once the vehicle is in motion and it has been determined that the RDS subscriber 102 is in the vehicle 100, the RDS policies are invoked by the GS-E 130. In the case of a mobile data request whenever an RDS subscriber originates a mobile data request (e.g. http request), the SGSN sends a notification to the GS-C 116 requesting instructions before the text can be routed. The combination of the GS-C 116 and GS-E 130 may act as a GGSN, so that the GS-C 116 appears to be a standard GGSN to the mobile network, which is securely interconnected via a secure tunnel to the GS-E 130 typically located in an enterprise 30.

The secure connection between the GS-C 116 and GS-E 130 can simply be an extension of the existing protocol between the SGSN and GGSN (e.g. gateway tunneling protocol (GTP) tunnel), or alternatively, can be a different security protocol specifically selected between the GS-C 116 and GS-E 130 in accordance with the requirements of a particular enterprise (e.g. a proprietary high encryption protocol can be utilized between the GS-C 116 and GS-E 130 for access to a military site).

The GS-C 116 identifies which GS-E 130 the subscriber belongs is subscribed with, for example the subscriber may be an employee of Acme corporation. The GS-C 116 then forwards the information about the mobile data request to the corresponding GS-E 130 located in the enterprise network 30 of Acme corporation. The information sent may include the originating subscriber information and address, the desired destination address, the subscriber's location as well as other network-based service information. Alternatively the GS-C 116 may elect to send the entire mobile data request to the GS-E 130.

On reception of the information from the GS-C 116, the GS-E 130 then applies logic to this information in accordance with specific policies to decide whether or not to allow the mobile data request to continue. If allowed, the GS-E 130 can route the mobile data request to its intended destination. The return address can either be set to the GS-E 130, which may maintain a session state in order to remember to allow the response to be delivered back to the device 102, assuming it was allowed to be delivered. Alternatively, the return address can be left unaltered such that the response will be delivered directly back to the RDS mobile 102, and would then be subject to policy on the response leg. In this latter case, the GS-E 130 does not need to maintain state information about the session.

If it is determined that the mobile data request is not allowed due to the vehicle being in motion with the RDS subscriber inside, then the RDS 108 may or may not inform the RDS subscriber 102, either via a mobile data response or a text message with reason (e.g. request denied, vehicle in motion). In the case of a request delivered to the RDS mobile 102, the above description remains the same, and the incoming request is subject to policies of the GS-E 130 before being delivered to the RDS mobile 102.

In both cases, it is possible to override the policy restrictions for mobile data requests to and from a specific list, such as system administrators, managers, spouse, children and/or specific devices. The override exceptions could be identified by their associated IP addresses, port numbers or other methods of identification in accordance with internet addressing techniques. Their address information may be stored in an exception list that is referenced each time a call or message is originated or received from the mobile device 102.

With regard to certain restriction areas, such as femtocells or femtozones, it is possible to impose policy restrictions on mobile device usage based on a specific location for any mobile device with the use of miniature mobile base stations such as femtocells. Femtocells are small cellular base stations, that are typically designed for use in a home or business, and which connect to the mobile carrier's network using a broadband connection typically over the Internet. These devices are typically used to allow service providers to extend service coverage indoors, where access may otherwise be limited or unavailable. The solution works with any mobile phone from a particular mobile service provider.

Extending this concept enables a femtocell or group of femtocells to be used not only for indoor use, but also outdoors, such as in a designated school zone, where using a mobile telephone may be prohibited while driving. This type of zone can be considered a femtozone. As a vehicle approaches the school zone where restriction policies are mandated, signage would indicate that the user is approaching a school zone where usage of mobile devices is not permitted while driving.

Figure 3:
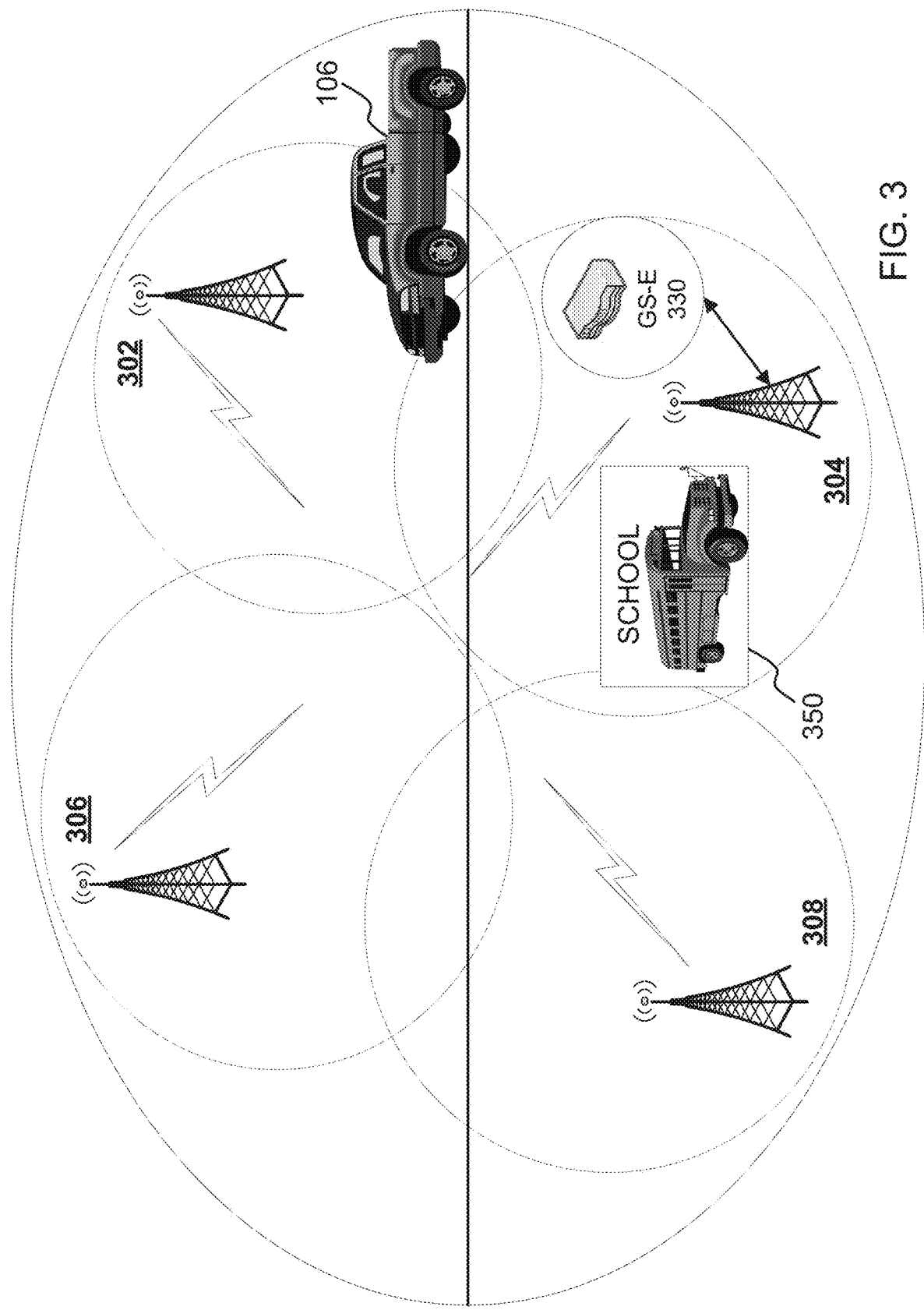
FIG. 3 illustrates an example femtozone network configuration, according to example embodiments of the present invention.

FIG. 3 illustrates a mobile device 102 traversing through various femtocell zone locations, according to example embodiments of the present invention. As any mobile device 102 inside the vehicle approaches the femtocell zones, or femtozone, the mobile device will attempt to connect to the femtocell base station. The femtozones illustrated in FIG. 3 may be placed alongside a road that the vehicle 100 is traveling. In this example, various femtozones are operated by base stations 302, 304, 306 and 308.

Note that a femtocell is required for each mobile service provider in a school zone, or alternatively a single femtocell can be shared by multiple mobile service providers. Note that it is possible that when a femtocell detects a mobile device approaching, but where the signal strength remains insufficient for the mobile to connect to the femtocell, it is possible for the femtocell to nevertheless inform the GS-C 116/GS-E 130, which could, in turn, send a timely text message to the mobile device to inform the subscriber that they are approaching a school zone where restrictions are in force and will be imposed. It is possible for the GS-E 130 to be located in a SCN that is managed and controlled by the school itself, a local government or municipality, a mobile service provider, and/or by a third party company offering such services.

For mobile devices that are not already engaged in an active call, the devices will register on the femtocell. The registration will be recorded in the HLR 112 and a VLR include din the MSC 110, and/or the HSS 114 and CSCFs 118-122, and/or the SGSN/GGSN of the GS-C 116 and GS-E 130. If a mobile device 102 that is registered on the femtocell attempts to make or receive a call, text and/or mobile data request, irrespective of whether or not the subscriber is designated as a RDS subscriber, the service provider's GS-C 116 will be informed of the call, text or data session in advance of it being routed.

In this case, the GS-C 116 can recognize that the subscriber 102 is located on a femtocell that is in a school zone, and therefore routes the information to a specific GS-E 330 that handles school zone restrictions for all subscribers of this mobile service provider. The GS-E 330 then can restrict the call, text and/or mobile data session, or apply specific policies as described earlier, such as to route an incoming call to voicemail.

The femtozone enabled GS-E 330 can enable restriction policies that take into account time of day (ToD), day of the week (DoW) and other criteria such as holidays to determine whether or not to invoke certain restriction policies. For example, the femtozone GS-E 330 may imposed full restrictions on calls, texts and mobile data during school zone times where vehicles are required to slow down to 20 mph, such as during morning drop-off and afternoon pickup times. Outside of these times, but still during the school day, the GS-E 330 could be set to restrict origination of outgoing calls and text messages but still allow incoming calls and text messages to be received at the mobile device 102 inside the vehicle 100. Outside of the school day as well as weekends and holidays, the system can be set to impose no restrictions.

If the subscriber 102 was traveling through the school zone is also a RDS subscriber, the GS-C 116 would assign the school zone GS-E 330 as the primary GS-E for imposing restrictions, and could subsequently defer to the enterprise GS-E 130 as a secondary GS-E, should additional restrictions be required. For example, if an RDS subscriber 102 were traveling through a schoolzone on the weekend, then the school GS-E 330 would impose no restrictions, however the enterprise GS-E 130 could still impose restrictions to prevent calls and text messages while the vehicle is in motion.

In the case of a call-in-progress, when any mobile subscriber 102 approaches the school zone femtocell, the call would be handed off to the femtocell as expected. In this example, certain policies could be instituted in which the call could be ended by the network, or other call handling procedures, such as pausing the conversation by placing the parties on hold and potentially playing a recorded message to indicate to one or both parties that the mobile user is in the school zone and will be placed on hold until they leave the school zone. The message played to the other party may be a message indicating the user is temporarily unavailable but will be reconnected shortly.

When the mobile subscriber exits the school zone and performs a handoff from the femtocell back to the macrocellular network of FIG. 1, the call can be reconnected automatically. Note that it is possible that a mobile subscriber that is not in a vehicle enters the femtozone will also have restrictions imposed. For example, although the mobile user may not be an RDS subscriber, the vehicle's RDSS system may still be used to restrictions on the user of the vehicle.

In order to enable mobile subscribers to exit a restricted mode, an override code can be used. For example, the system may send a user a text message as they approach a femtocell or when they have already registered on the femtocell, and therefore have been restricted. The text message may include an override code that the user can invoke. This code can be made sufficiently lengthy so as to significantly discourage users in a vehicle from attempting to enter the override code during the period in which they're located in the femtozone.

Another example may include calculating the vehicle's location at multiple points to determine velocity, and if the user exceeds a certain speed for walking such as 5 mph, then it can be assumed the mobile subscriber is in a vehicle. This example can make use of network-based GPS calculations via the MLC and GS-C 116 and GS-E 130, or alternatively using an open and accessible GPS device on the mobile device itself, or a combination of network and device-based GPS implementations.

In another example, by setting up a series of femtocells within the school zone, instead of a single femtocell, it is possible to enable the femtocells to be utilized to ascertain the location rather than burdening the more expensive macro cellular network. Referring to FIG. 3, a school zone can be setup with multiple femtocells, such as three or more (e.g., 302, 304, 306 and 308). The first zone 304 may be one end of the school zone, the second zone 302 may be within the schoolzone area of the school 350 but away from the street, and the third and fourth, 306 and 308, respectively, may be located at opposite ends of the femtozone.

In this school zone example, three of the four femtocell base stations may form a triangle that can be used to determine location information within the primary femtozone 302 via triangulation of the mobile device power signal or via any comparable position determining algorithm. These location calculations can be handled by a dedicated MLC either in the service provider's network, a network dedicated to a group of schools and/or school zones, or to a single school zone. In this case, it is possible for a dedicated MLC to be connected directly to a femtocell controller included in the GS-E 330, exclusively for calculating velocity. In this manner, the service provider's main MLC typically used for 911 emergency calls on the macro cellular network will not be overloaded, nor will the macro network cellular radios be overloaded with mobile location requests.

In another method, any mobile device that enters the school zone can attach to the femtocell, and once connected with the femtocell, the mobile device will automatically be subject to restriction policies in accordance with the rules (e.g. during the school zone restriction period when the lights are flashing, restrict all incoming/outgoing calls, outgoing texts and mobile data requests, etc.). This implies that all mobile devices may be subject to the policies, conditions and restrictions of the school zone, irrespective of whether the mobile user is walking, or driving in a vehicle.

When the user makes or receives calls or text messages or originates mobile data, the network will request their permission to proceed and by doing so the user is acknowledging that they are in compliance with the local regulations (i.e. that they are not the driver of a motor vehicle at the time of the event). The mobile user's acknowledgement is recorded in the system as an event, and can be later retrieved should the user have been found to be driving in violation of the rules.

According to one example method of operation, a mobile user may enter the school zone and connect to the femtocell, the user may attempt to originate a call. Before the call is routed to its intended destination, a recorded message can be played to the originating party stating for example, "you are in a school zone where it is prohibited to use your mobile phone while driving. Press 1 or say "proceed" to acknowledge that you are not driving or press 2 for help". The user may then press 1 or say "proceed", or press 2 or say "help" for more information. The system records the user's selection in its database, and allows the call to proceed. Otherwise, the call may be terminated.

A user that is a passenger in the vehicle (not the driver), or who is a pedestrian in the school zone, can enable calls to be routed without restriction. Note that the system can also record that the user hung up the call or simply did not proceed with the call. This information can be used as a confirmation that the user heard the message and realized they were in the school zone, and elected to comply with the regulation by not proceeding with the call. If the user selects 2 or says "help", the system can inform the user of additional information, such as the regulations, the times when the regulations are in force, as well as override capabilities described in detail below.

In the event of calls terminated to a mobile user in the femtocell after the mobile phone rings, the subscriber can answer the call and be played a similar message. The user can then hang up or press 1 or say "proceed" to acknowledge that they are not driving in order to proceed with accepting the call. In the case of the user originating a text message, after the user has sent the text message, the system can respond with a text message stating "you are in a school zone where it is prohibited to use your mobile phone while driving, reply to this message with ["p"] to proceed and acknowledge that you are not driving". Note the text within the brackets can be optional. If the user responds to the text message with ["p"] if the message so stated, the system records the user's choice in the database, and then allows the text message to be delivered.

The system may not prevent the user from composing and sending the text message in the first place. However, the notifications will make the user aware of the regulation for subsequent messages and prevent the message from being delivered without their confirmation of acknowledgement. The user's action on whether or not to proceed will be recorded in the system and can be later retrieved. The user may be required to undergo additional operations and steps to send or receive a text message while traveling through a regulated area or zone. This add-on feature of the local system may be a deterrent or avoidance procedure in of itself without requiring the ability to block or stop a user's cellular service.

If the user elects not to proceed by responding with any other information than what was specified or by not responding at all, the text message can either be discarded and the user will have to re-send the message when they are out of the school zone, or alternatively the system can automatically send the message when the user's mobile registers that it has left the school zone (by exiting the femtocell and connecting to the macro cell). Alternatively, the system can inform the user with a text message when the user has exited the school zone that they have a text message pending for delivery and request the user if the message should be sent, to which the user can respond by replying to this notification text message whether to deliver or discard the message. The user's decision can also be recorded by the system by indicating that the user waited until exiting the school zone to deliver the message.

Incoming text messages can be held in a store-and-forward queue until the subscriber exists the femtozone. However, if the user is a pedestrian or someone who is not the driver then they will not have knowledge that text messages are waiting for them. In this case a text message can be sent to the user stating "you have a text message waiting but you are in a school zone where it is prohibited to use your mobile phone while driving, reply to this message with ["p"] to proceed and to acknowledge that you are not driving." If the user responds with "p", the system records the user's choice in the database, and then allows the text message to be delivered. The user's action on whether or not to proceed will be recorded in the system and can be later retrieved.

If the user elects not to proceed by responding with any other information other than what was specified, or by not responding at all, the text message can either be discarded, or alternatively, the system can automatically send it when the user's mobile device confirms that it has left the school zone. The mobile device may confirm that it is ready to accept communications by exiting the femtocell and connecting to the macro cell, or the system can inform the user with a text message when they have exited the school zone that they have a text message pending. The system may send a request to the user to determine if the message should be delivered. In response, the user can respond to the notification text message whether to deliver or discard the message. This information can also be recorded by the system (e.g. that the user waited until exiting the school zone for delivery of the message).

Note that in some cases, calls or texts to or from emergency numbers such as 911 will always override these policies. For pedestrians or drivers that are regularly in the school zone during the restriction periods, the system can enable them to use override codes to be able to record their acknowledgements that they are not driving without having to go through the steps of responding to a confirmation message. These override capabilities can also be enabled for RDS subscribers, so that they are able to override the system in an emergency, if they are not the driver of the vehicle, or for other reasons while ensuring that their decision to override is recorded by the system.

For example, a user originating a mobile phone call or text message can enter a prefix code such as *11 before the digits to be dialed, or append a postfix code such as #11 to the digits to be dialed. By including such a code, the system may consider that the user is not the driver and therefore should proceed with the call or text message. The system would strip the prefix or postfix, record the user's acknowledgement in the database and then proceed with the call or text message. The system can be set to require the prefix or postfix code for each and every call or text message, or can be set to require the code only for the first communication attempt, until such time as the user has exited the school zone, or the restriction period has ended.

Different override codes can be used for different reasons with different policies. For example, *99 or #99 can be used by the subscriber to indicate that the override request was to address an emergency situation. In another example, *22 or #22 could be used to indicate that the override request was to indicate that the user is in a school zone but are not in a vehicle.

In another case, it is possible to override the system automatically if the system determines the mobile device is specifically exempt from the policies. For example, if the subscriber is also an RDS subscriber and the system has been able to determine that they are in their vehicle within the school zone and that the vehicle is stopped or traveling below the threshold above which the restrictions normally apply, then the system can automatically enable calls and/or texts or mobile data to be utilized by the user without having to go through the steps of responding to a confirmation message.

Regulating the mobile device communications in certain geographical areas may be performed with modifications to the device itself. Also, no software is required to be deployed onto the mobile device 102. Also, there is no requirement that a mobile device support a GPS service, Bluetooth, WiFi, etc. Such a system may enable the aggregation of both the vehicle and calling data in the network to be reviewed, verified and serve as input to driver scoring algorithms, insurance ratings or other statistical analyses. Other features may enable the carrier to be an integral part of the value proposition so the carrier's network information is utilized to enable the system.

Figure 4:
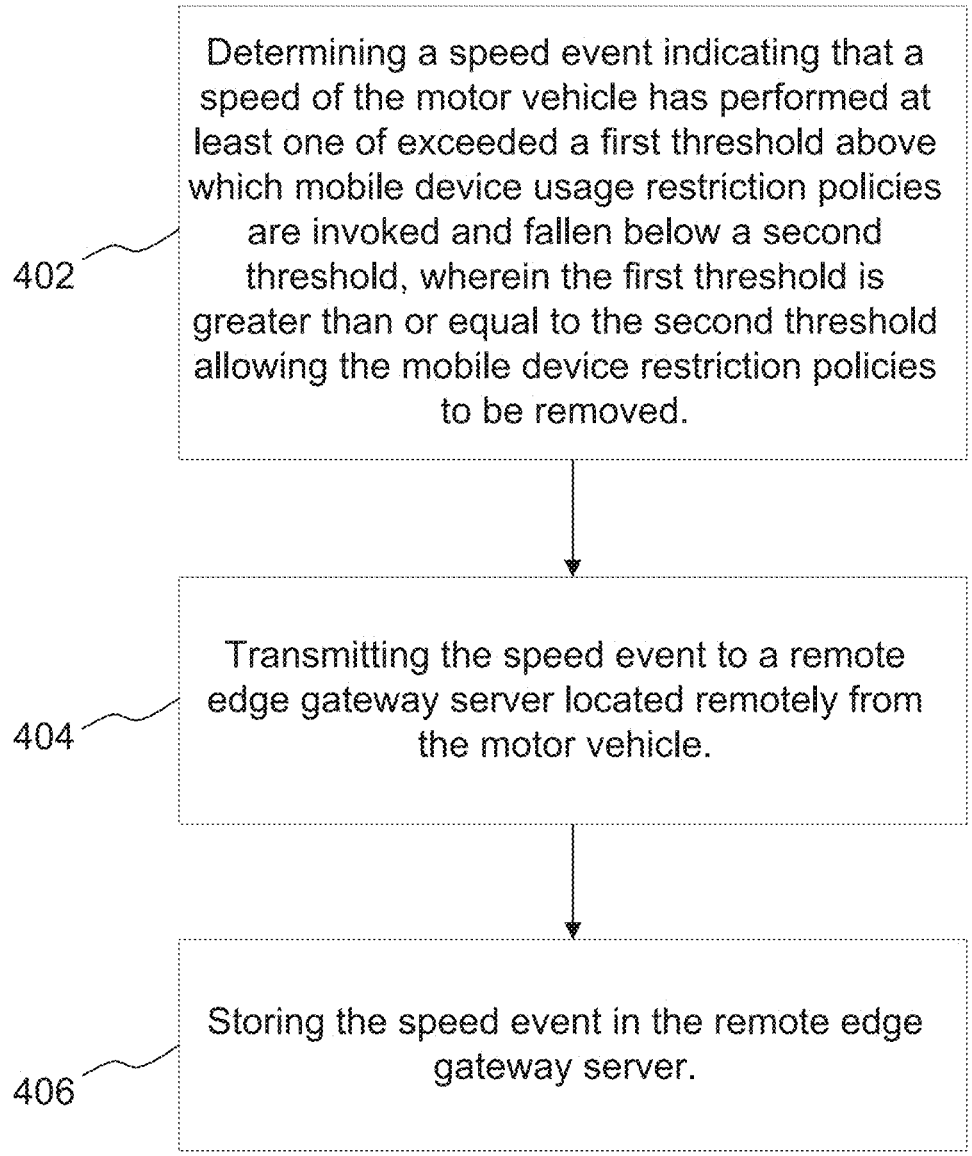
FIG. 4 illustrates a flow diagram of an example method according to an example embodiment of the present invention.

FIG. 4 illustrates an example method of regulating mobile device communications while operating a motor vehicle. Referring to FIG. 4, the method may include transmitting a connection request message to a first base station to a session switching network via the mobile device traveling in a moving motor vehicle, at operation 402. The method may also include transmitting a notification message identifying the mobile device to a gateway server from the session switching network, at operation 404, and receiving a treatment response from the gateway server, the treatment response ordering a treatment different from a normal treatment to reflect restrictions on the use of the mobile device within a communication area of the base station, at operation 406.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent any of the above-described network components 102-134, etc.

Figure 5:
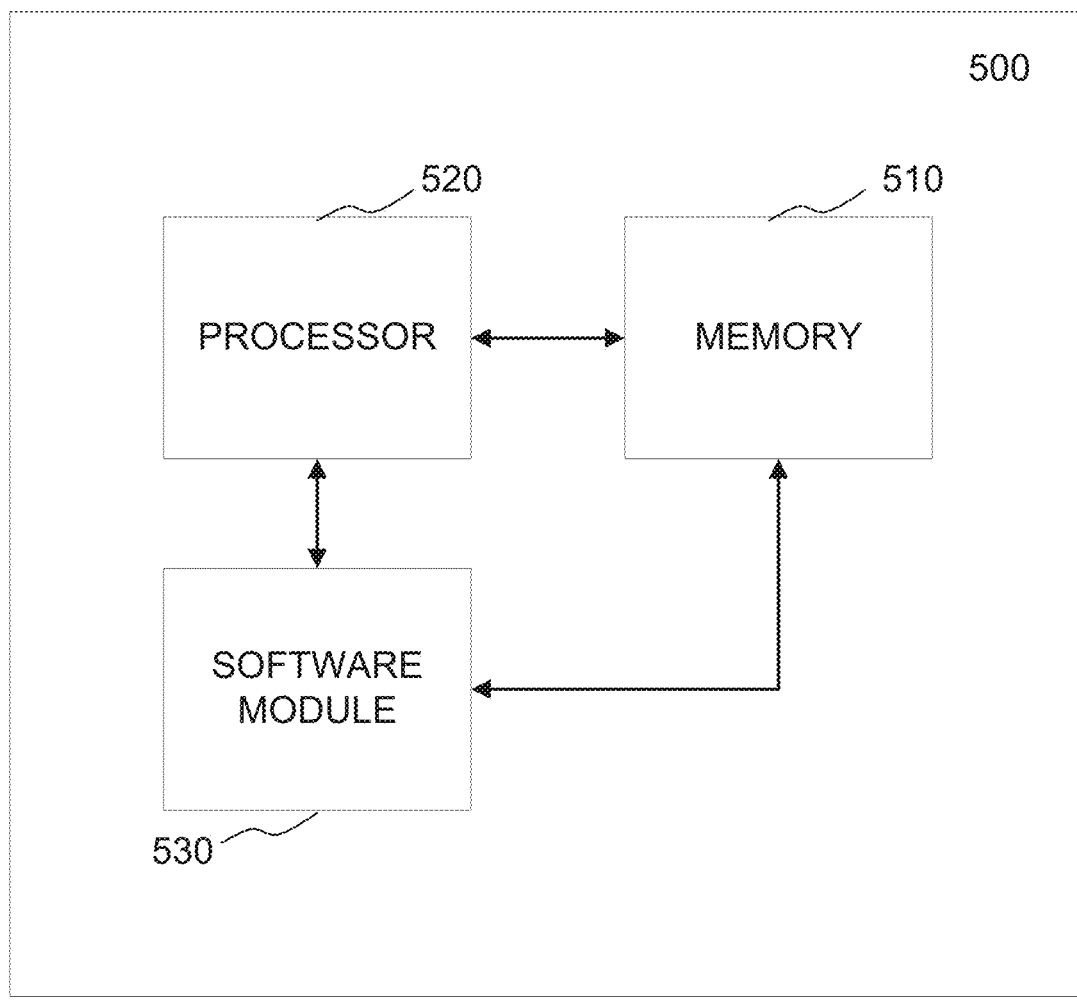
FIG. 5 illustrates an example network entity device configured to store instructions, software, and corresponding hardware for executing the same, according to example embodiments of the present invention.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. The computer readable medium may be a non-transitory computer readable medium that includes tangible hardware components in addition to software stored in memory. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   determining, by a remote server, a mobile device is engaged in a call in-progress with a base station, wherein the mobile device is in a transport in motion;
   determining, by the remote server, based on a hysteresis profile, a speed of the transport in motion compared to one or more of a hysteresis activation speed and a hysteresis deactivation speed;
   responsive to the speed of the transport in motion being above the hysteresis activation speed, receiving by a carrier server a message to apply restriction policies to the transport to restrict use of the mobile device;
   responsive to the speed of the transport in motion being below a hysteresis deactivation speed, receiving by the carrier server a message to remove restriction policies to the transport to permit use of the mobile device; and
   applying, by the carrier server, a policy related to the hysteresis profile to the call in-progress.

2. The method of claim 1, further comprising querying, by the carrier server, the remote server for the policy, wherein the policy comprises at least one of rerouting, intercepting, delaying and disallowing the call in-progress.

3. The method of claim 1, further comprising at least one of: notifying the remote server of the call in-progress, and verifying a speed threshold to determine whether to invoke the policy and apply a mobile device usage restriction policy.

4. The method of claim 1, further comprising at least one of: sending routing instructions to the carrier server indicating how to route the call, and routing the call responsive to receiving the routing instructions.

5. The method of claim 1, further comprising not applying the policy to the call in-progress, by the remote server, when determining that the mobile device is not located inside the transport.

6. The method of claim 1, further comprising invoking the policy to restrict the mobile device when a speed threshold is triggered.

7. The method of claim 6, further comprising removing the policy restricting the mobile device when a second speed threshold is triggered, wherein the second speed threshold is equal to or less than the speed threshold.

8. A non-transitory computer readable medium comprising instructions that, when read by at least one processor, cause the at least one processor to perform:
   determining, by a remote server, a mobile device is engaged in a call in-progress with a base station, wherein the mobile device is in a transport in motion;
   determining, by the remote server, based on a hysteresis profile, a speed of the transport in motion compared to one or more of a hysteresis activation speed and a hysteresis deactivation speed;
   responsive to the speed of the transport in motion being above the hysteresis activation speed, receiving by a carrier server a message to apply restriction policies to the transport to restrict use of the mobile device;
   responsive to the speed of the transport in motion being below a hysteresis deactivation speed, receiving by the carrier server a message to remove restriction policies to the transport to permit use of the mobile device; and
   applying, by the carrier server, a policy related to the hysteresis profile to the call in-progress.

9. The non-transitory computer readable medium of claim 8, further comprising instructions that, when read by the at least one processor, cause the at least one processor to perform querying, by the carrier server, the remote server for the policy, wherein the policy comprises at least one of rerouting, intercepting, delaying and disallowing the call in-progress.

10. The non-transitory computer readable medium of claim 8, further comprising instructions that, when read by the at least one processor, cause the at least one processor to perform at least one of: notifying the remote server of the call in-progress, and verifying a speed threshold to determine whether to invoke the policy and apply a mobile device usage restriction policy.

11. The non-transitory computer readable medium of claim 8, further comprising instructions that, when read by the at least one processor, cause the at least one processor to perform at least one of: sending routing instructions to the carrier server indicating how to route the call, and routing the call responsive to receiving the routing instructions.

12. The non-transitory computer readable medium of claim 8, further comprising not applying the policy to the call in-progress, by the remote server, when determining that the mobile device is not located inside the transport.

13. The non-transitory computer readable medium of claim 8, further comprising instructions that, when read by the at least one processor, cause the at least one processor to perform invoking the policy to restrict the mobile device when a speed threshold is triggered.

14. The non-transitory computer readable medium of claim 13, further comprising removing the policy restricting the mobile device when a second speed threshold is triggered, wherein the second speed threshold is equal to or less than the speed threshold.

15. A system, comprising:
   a carrier server; and
   a remote server configured to:
   determine a mobile device is engaged in a call in-progress with a base station, wherein the mobile device is in a transport in motion;
   determine based on a hysteresis profile, a speed of the transport in motion compared to one or more of a hysteresis activation speed and a hysteresis deactivation speed;
   responsive to the speed of the transport in motion being above the hysteresis activation speed, receive by the carrier server a message to apply restriction policies to the transport to restrict use of the mobile device;
   responsive to the speed of the transport in motion being below a hysteresis deactivation speed, receive by the carrier server a message to remove restriction policies to the transport to permit use of the mobile device; and
   apply, by the carrier server, a policy related to the hysteresis profile to the call in-progress.

16. The system of claim 15, wherein the carrier server is further configured to query the remote server for the policy, wherein the policy comprises at least one of a reroute, an intercept, a delay and a disallow of the call in-progress.

17. The system of claim 15, wherein the carrier server is further configured to perform at least one of: notify the remote server of the call in-progress, and verify a speed threshold to determine whether to invoke the policy and apply a mobile device usage restriction policy.

18. The system of claim 15, wherein the remote server is further configured to perform at least one of: send route instructions to the carrier server that indicated how to route the call, and route the call responsive to reception of the route instructions.

19. The system of claim 15, wherein the remote server is further configured to not apply the policy to the call in-progress when it is determined that the mobile device is not located inside the transport.

20. The system of claim 15, wherein the remote server is further configured to invoke the policy to restrict the mobile device when a speed threshold is triggered.

* * * * *